(12) United States Patent
Ronge

(10) Patent No.: US 7,162,936 B2
(45) Date of Patent: Jan. 16, 2007

(54) CONNECTION OF A GEARBOX COOLING TO THE COOLING CIRCUIT OF AN ENGINE

(75) Inventor: Ludger Ronge, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 399 days.

(21) Appl. No.: 10/481,093

(22) PCT Filed: Jul. 6, 2002

(86) PCT No.: PCT/EP02/07556

§ 371 (c)(1),
(2), (4) Date: Dec. 17, 2003

(87) PCT Pub. No.: WO03/006850

PCT Pub. Date: Jan. 23, 2003

(65) Prior Publication Data

US 2004/0235602 A1    Nov. 25, 2004

(30) Foreign Application Priority Data

Jul. 12, 2001    (DE) .................................. 101 34 042

(51) Int. Cl.
*F16H 57/04*    (2006.01)
(52) U.S. Cl. .................................................. 74/606 A
(58) Field of Classification Search ............. 123/41.01, 123/41.31; 74/606 R, 606 A; 184/6.12, 184/613, 6.22, 104.2, 104.3
See application file for complete search history.

(56) References Cited

U.S. PATENT DOCUMENTS

| 4,198,819 A | 4/1980 | Bourne | 60/337 |
|---|---|---|---|
| 4,226,200 A | 10/1980 | Morisawa et al. | 74/606 R |
| 4,284,913 A * | 8/1981 | Barnhardt | 310/54 |
| 4,356,889 A * | 11/1982 | Teeter | 184/6.12 |
| 4,400,989 A | 8/1983 | Ikemoto et al. | 74/467 |
| 4,738,159 A | 4/1988 | Kato et al. | 74/606 R |
| 4,962,830 A * | 10/1990 | Potts | 184/6.4 |
| 5,638,774 A * | 6/1997 | Albertson et al. | 123/41.33 |
| 5,678,461 A * | 10/1997 | Stine | 74/606 A |
| 5,829,562 A * | 11/1998 | Adams et al. | 192/218 |
| 6,021,868 A * | 2/2000 | Bogema | 184/104.3 |
| 6,058,969 A | 5/2000 | Bollwahn et al. | 137/583 |

FOREIGN PATENT DOCUMENTS

| DE | 28 25 813 | 1/1979 |
|---|---|---|
| DE | 80 11 385 | 4/1980 |
| DE | 196 03 184 A1 | 7/1997 |
| DE | 196 25 357 A1 | 1/1998 |
| EP | 0 716 966 A2 | 6/1996 |
| EP | 0 990 820 A2 | 4/2000 |
| JP | 08247263 | 9/1996 |

* cited by examiner

Primary Examiner—Vicky A. Johnson
(74) Attorney, Agent, or Firm—Davis & Bujold, P.L.L.C.

(57) ABSTRACT

A vehicle transmission (2) includes a transmission housing (4), a clutch bell housing (6), and lines (20, 22, 36, 38) for a liquid cooling medium and is connected at a junction point to a vehicle engine (26). In the area of the junction point two, first coupling flanges (16, 18) are provided on the clutch bell housing (6), and two second coupling flanges (30, 32) are provided on the vehicle engine (6), which flanges can be joined for the purpose of transferring the cooling medium between the vehicle engine (26) and the vehicle transmission (2).

9 Claims, 3 Drawing Sheets

CONNECTION OF A GEARBOX COOLING TO THE COOLING CIRCUIT OF AN ENGINE

This application is a national stage completion of PCT/EP02/07556 filed Jul. 6, 2002 which claims priority from German Application Serial No. 101 34 042.7 filed Jul. 12, 2001.

FIELD OF THE INVENTION

The invention relates to a vehicle transmission.

BACKGROUND OF THE INVENTION

In the cooling of a vehicle transmission and especially in the cooling of an auxiliary retarding braking system, such as a hydrodynamic retarder, for example, or an intarder that is integrated into the transmission housing, the heat that is generated during the braking process must be drawn off. At this time, heat exchangers that release the heat generated in the retarder into the environment are still being used. Integrating the retarder into the vehicle cooling system has also already been considered. The heat exchanger can thereby be arranged in a separate component on the transmission, or may be integrated into the transmission housing, installed in the tube in the housing, or the housing can be designed to have multiple walls. From DE 196 25 357 a heat exchanger that is integrated into a transmission housing is known; however, it is not connected to the vehicle cooling circuit. If the cooling of the transmission or the retarder is to be integrated into the cooling circuit of the vehicle, there must be a connection between the transmission and the engine. In current systems, the two cooling systems normally are separate.

The object of the invention is to disclose a connection between the cooling system of a transmission or retarder and the vehicle.

SUMMARY OF THE INVENTION

On a vehicle transmission, which includes a transmission housing, a clutch bell housing and lines for a liquid cooling medium and which is connected at a junction point to a vehicle engine, two first coupling flanges are provided on the clutch bell housing in the area of the junction point, and two second coupling flanges are provided on the vehicle engine, also in the area of the junction point, whereby the second coupling flanges can be joined to the first coupling flanges for the purpose of transferring the cooling medium between the vehicle engine and the vehicle transmission. These coupling flanges can form a standard attachment flange. Via these flanges, the vehicle cooling medium flows, on the one hand, as a cool liquid to the transmission or retarder and, on the other hand, as a heated liquid back from the transmission or retarder into the vehicle cooling circuit and the main vehicle heat exchanger (radiator). For example, additional tubes, which take up space inside the vehicle and carry with them a risk of injury, when maintenance work is being performed, can be avoided, because only a short connecting flange is necessary. In one version, the first and the second flanges are arranged inside the clutch bell housing and, in another execution model, the first and the second flanges are arranged in the exterior perimeter area of the clutch bell housing. In one advantageous model the cooling medium flows from the first flanges on the clutch bell housing directly into a double-walled transmission housing or tube in the housing of the transmission. In another advantageous variation, the coolant flows from the first flanges on the clutch bell housing through tubes arranged externally on the transmission housing to the retarder. In one execution model, a heat exchanger is provided on or in the transmission housing, which absorbs the heat generated by the retarder and is connected to the vehicle cooling system to which it delivers the heat. In an execution model, the transferred cooling medium is the cooling medium from the retarder while, in another variation, the cooling medium is the working fluid of the retarder. When a retarder that uses water as its working fluid is used, the vehicle cooling medium is also the working fluid of the retarder. In one construction, the clutch bell housing is attached to the transmission housing as a separate component, in another design the clutch bell housing is integrated into the transmission housing.

BRIEF DESCRIPTION OF THE DRAWINGS

The invention will now be described, by way of example, with reference to the accompanying drawings in which.

DETAILED DESCRIPTION OF THE INVENTION

Figure 1:
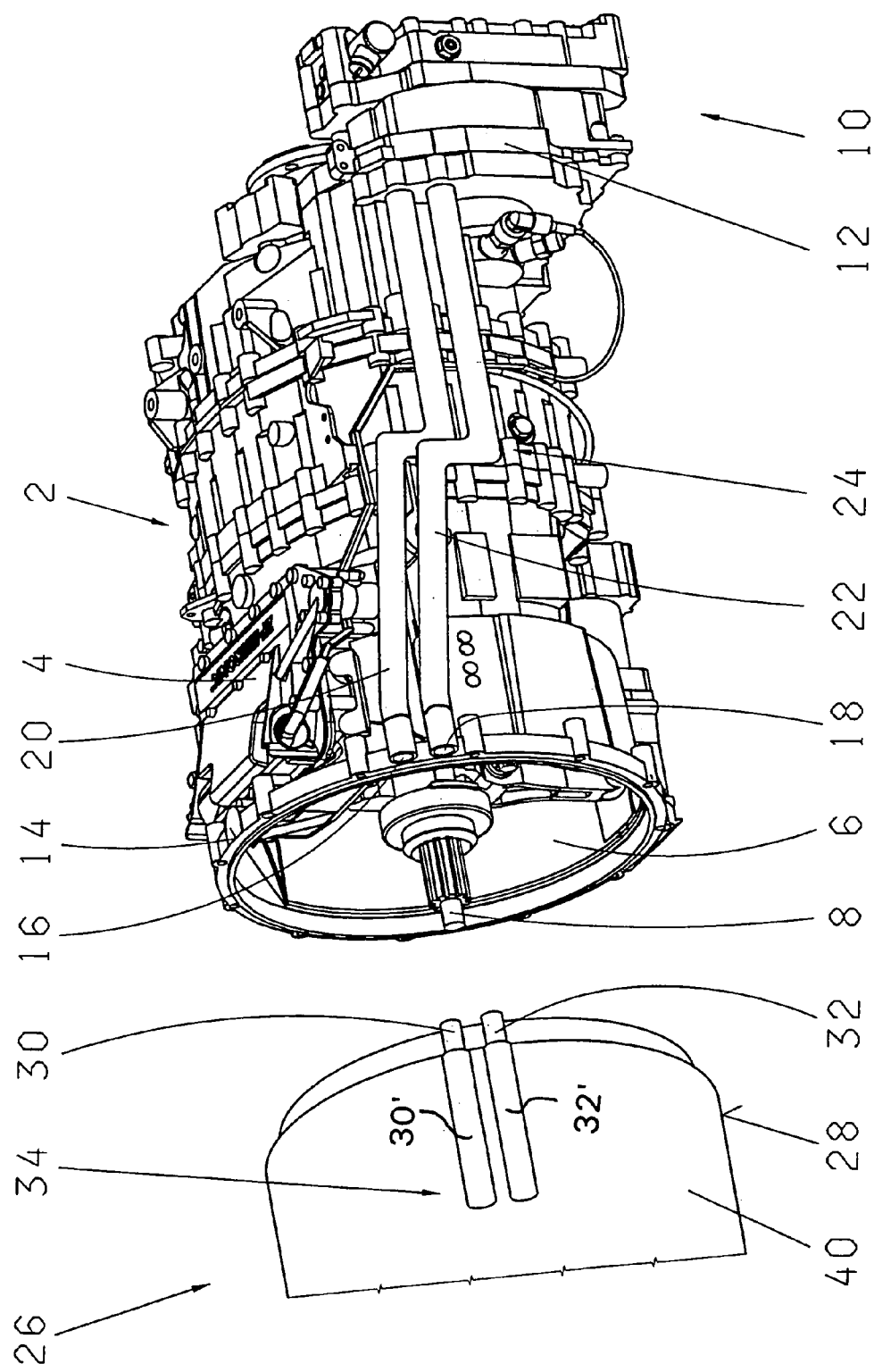
FIG. 1 is a transmission with external tubes.

In FIG. 1, a transmission housing 4 of a vehicle transmission 2 is shown, which has a clutch bell housing 6 into which an input shaft 8 of the transmission 2 extends. A retarder 10 is attached to the transmission housing 4, with a retarder housing 12 being permanently affixed to the transmission housing 4. On the outer perimeter 14 of the clutch bell housing 6, two coupling flanges 16 and 18 are provided, each of which is connected to a tube 20 and 22. The tubes 20 and 22 are routed along the outer surface of the transmission housing 4, whereby they follow a reduced perimeter of the transmission housing 4, for example, in an area 24 and finally end in the retarder housing 12. The tube 20 serves, for example, to supply a cooled cooling medium to the retarder 10, while the tube 22 serves to draw off a heated cooling medium from the retarder 10. In this manner, either the retarder 10 is cooled directly in the retarder housing 12 or, if the cooling medium also serves as the working fluid for the retarder 10, the working fluid is supplied and drawn off directly. A drive engine 26 of a vehicle (not shown here), can be connected to the clutch bell housing 6. On an outer perimeter 28 of an engine housing 40, two coupling flanges 30 and 32 are attached which join the engine housing 40 in an area 34 where they are connected to the lines 30' and 32' for the cooling medium for the engine 26. On the openings for the coupling flanges 16, 18, 30, 32, sealing devices are provided which enable a sealed transfer of a liquid cooling medium between the engine 26 and the transmission 2.

Figure 2:
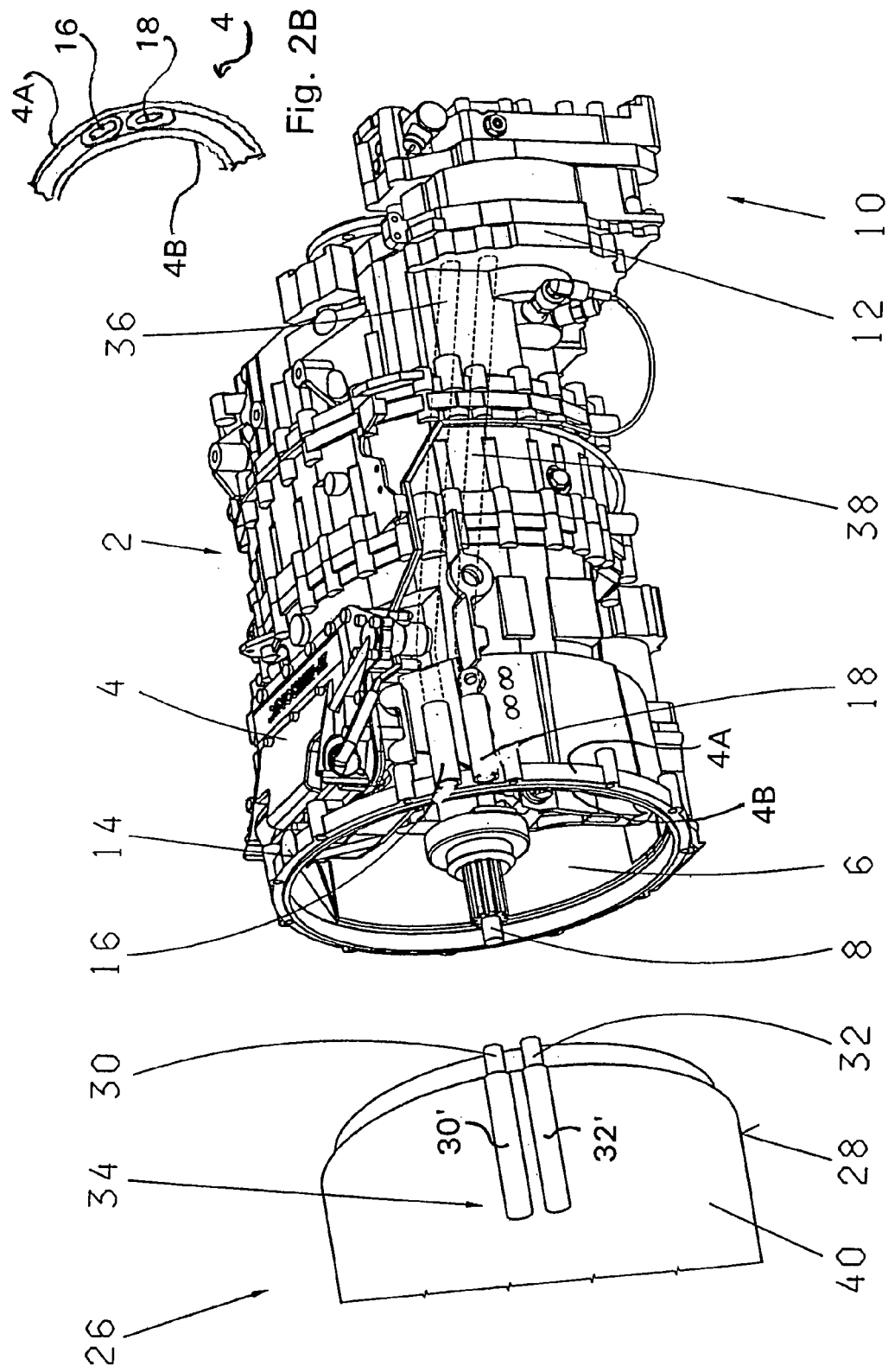
FIGS. 2A and 2B show a double walled transmission with lines that lie partially inside the housing.

Contrary to FIG. 1, FIGS. 2A and 2B has no external tubes, rather the coupling flanges 16, 18 join directly to the transmission housing 4 where they serve, for example, to supply a cooling medium to the transmission 2 itself or to supply a cooling medium or working fluid through to the retarder 10 via tubes 36, 38, (indicated by dashed lines), through walls 4A and 4B of a double-walled transmission housing 4.

Figure 3:
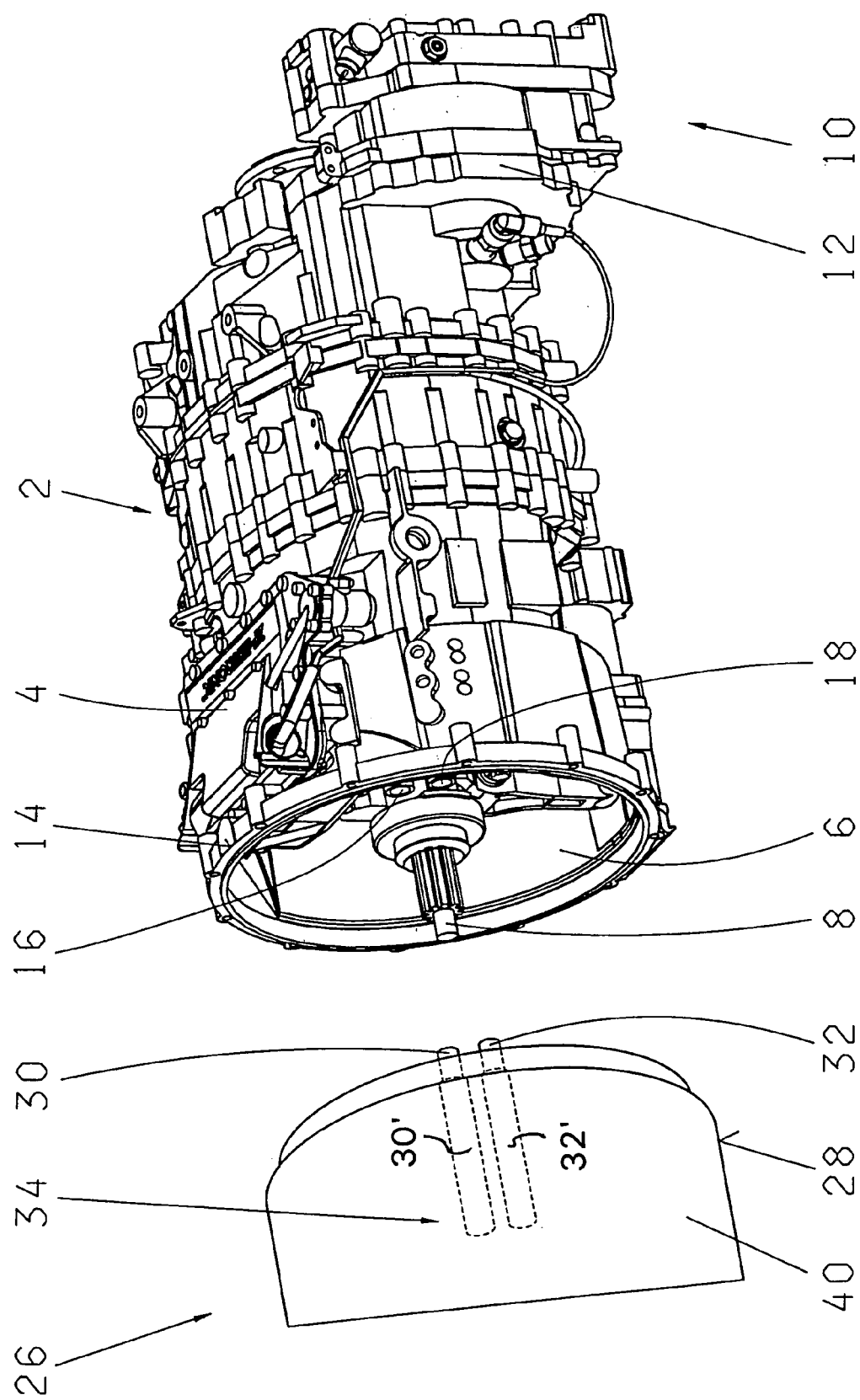
FIG. 3 is a transmission with flanges inside the clutch bell housing.

In FIG. 3, the coupling flanges 16, 18, 30 and 32 are installed inside the clutch bell housing 6 or inside the outer perimeter 14 of the transmission housing 6 and inside the outer perimeter 28 of the engine housing 40. In this way, no special measures are required on the surface of the housings 4 and 40. The coupling flanges 30 and 32 are attached in the engine housing 40 to the lines 30', 32' there for the cooling medium of the engine 26. In the transmission housing 4, the coupling flanges 16 and 18 are attached to lines (not visible here), inside the double-walled transmission housing 4 for the purpose of cooling the purpose of cooling the transmission 2 and/or the retarder 10.

REFERENCE NUMERALS

2 vehicle transmission
4 transmission housing
6 clutch bell housing
8 input shaft
10 retarder
12 retarder housing
14 perimeter
16 coupling flange
18 coupling flange
20 tube
22 tube
24 area
26 drive engine
28 perimeter
30 coupling flange
32 coupling flange
34 area
36 tube
38 tube
40 engine housing

The invention claimed is:

1. A system for providing a flow of cooling medium between cooling medium lines (30', 32') of an engine (26) and a hydrodynamic retarder housing (12) wherein the hydrodynamic retarder housing (12) is located at a first end of a transmission housing (4) and a second end of the transmission housing (4) is mounted to the engine by a clutch bell housing (6) mating with the engine (26), comprising:

first coupling flanges (16, 18) are mounted to the clutch bell housing (6) at a junction between the clutch bell housing (6) and the engine (26), each first coupling flange (16, 18) being connected to a corresponding cooling medium tube (20,22) for conveying cooling medium to the retarder housing (12), second coupling flanges (30, 32) connected to engine cooling medium lines (30', 32') of the engine (26) and mounted to the engine (26) at the junction between the clutch bell housing (6) and the engine (26) so that corresponding ones of the first and second coupling flanges come into connecting mating relationships to connect each cooling medium tube (20, 22) to a corresponding one of the engine cooling medium lines (30', 32').

2. The system according to claim 1, wherein the first coupling flanges (16, 18) and the second coupling flanges (30, 32) are arranged inside the clutch bell housing (6).

3. The system according to claim 1, wherein the first coupling flanges (16, 18) and the second coupling flanges (30, 32) are arranged on an outer perimeter (14) of the clutch bell housing (6).

4. The system according to claim 1, wherein the cooling medium flows from the first coupling flanges (16,18) on the clutch bell housing (6) directly into one of a double-walled transmission housing or into the tubes (36, 38) in the housing (4) of the transmission (2).

5. The system according to claim 1, wherein the cooling medium flows from the first coupling flanges (16,18) on the clutch bell housing (6) through the tubes (20, 22) that are arranged externally on the transmission housing.

6. The system according to claim 1, wherein a heat exchanger is provided on or in the transmission housing (4), which draws off generated heat, and is connected via the tubes (20, 22, 36, 38) and coupling flanges (16, 18, 30, 32) to a cooling system for the vehicle, to which the heat exchanger delivers the generated heat.

7. The system according to claim 1, wherein the cooling medium is the cooling medium for a retarder (10).

8. The system according to claim 1, wherein the cooling medium is a working fluid for a retarder.

9. The system according to claim 1, wherein the cooling medium for the vehicle is also the working fluid for the retarder (10), when the retarder (10) has water as its working fluid.

* * * * *